United States Patent
Bai et al.

(10) Patent No.: US 11,384,275 B2
(45) Date of Patent: Jul. 12, 2022

(54) HIGH TEMPERATURE-RESISTANT AND HIGH OIL-ABSORPTION RESIN PARTICLE PLUGGING AGENT SUITABLE FOR OIL-BASED DRILLING FLUID AND ITS PREPARATION METHOD

(71) Applicant: CHINA UNIVERSITY OF PETROLEUM (EAST CHINA), Qingdao (CN)

(72) Inventors: Yingrui Bai, Qingdao (CN); Jinsheng Sun, Qingdao (CN); Kaihe Lv, Qingdao (CN); Xianbin Huang, Qingdao (CN); Xiaosen Shang, Qingdao (CN); Jiafeng Jin, Qingdao (CN); Jingping Liu, Qingdao (CN); Jintang Wang, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 17/151,386

(22) Filed: Jan. 18, 2021

(65) Prior Publication Data

US 2021/0139764 A1  May 13, 2021

(51) Int. Cl.
  *C09K 8/502* (2006.01)
  *C09K 8/508* (2006.01)

(52) U.S. Cl.
  CPC ............ *C09K 8/5083* (2013.01); *C09K 8/502* (2013.01)

(58) Field of Classification Search
  CPC ...... C09K 8/5083; C09K 8/502; C09K 8/516; C09K 2208/10; C09K 8/035; C09K 8/03; C09K 8/426; C09K 8/467; C08F 222/1006
  See application file for complete search history.

(56) References Cited

U.S. PATENT DOCUMENTS 10,266,617 B2 * 4/2019 Su .............. C09K 8/512
2018/0118993 A1 * 5/2018 Lv .............. C09K 8/24

FOREIGN PATENT DOCUMENTS

CN       109735311 A  *  5/2019

* cited by examiner

*Primary Examiner* — Kumar R Bhushan
(74) *Attorney, Agent, or Firm* — CBM Patent Consulting, LLC

(57) ABSTRACT

A high temperature-resistant and high oil-absorption resin particle plugging agent suitable for oil-based drilling fluid and its preparation method is prepared from raw materials in parts by mass as follows: 15-30 parts of reaction monomers, 5-12 parts of linear high polymers, 0.1-1.5 parts of cross-linking agents, 0.1-0.5 parts of initiators, 1-3 parts of modified starches, 1-5 parts of filler particles and 1-5 parts of dispersing agents; it has high oil absorption capacity under a high-temperature condition and high toughness after oil-absorbing expansion.

14 Claims, No Drawings

HIGH TEMPERATURE-RESISTANT AND HIGH OIL-ABSORPTION RESIN PARTICLE PLUGGING AGENT SUITABLE FOR OIL-BASED DRILLING FLUID AND ITS PREPARATION METHOD

This application claims priority to Chinese Patent Application Ser. No. CN202010150958.4 Filed 6 Mar. 2020.

TECHNICAL FIELD

The invention is related to a high temperature-resistant and high oil-absorption resin particle plugging agent suitable for oil-based drilling fluid and its preparation method and belongs to the technical field of drilling fluid leakage plugging.

BACKGROUND ART

With the increasing demand for energy due to China's economic development, the exploration and exploitation of oil and gas resources have begun to switch from shallow layers to deep layers and the geological conditions encountered by drilling have become more and more complex. Harsh geological conditions have put forward higher requirements for drilling technologies. As one of the important topics of long-term research in the drilling engineering field, the plugging technologies have made considerable progress in recent years; both the variety of plugging materials and the plugging success rate are increasing. Due to the complicated reasons and various constraints in the lost circulation and the strong pertinence of plugging technologies, there is still no good solution for the problem of loss circulation, which causes serious economic losses.

The oil-based drilling fluid takes oil as the continuous phase and has a good inhibitory effect on the water-sensitive formation. It is considered as the optimal choice for shale formations prone to lost stability and collapse. However, when loss circulation occurs in the process of drilling with oil-based drilling fluid, it will seriously endanger the safety of drilling operations; especially, considering the high cost of oil-based drilling fluid, great economic losses will be caused. At present, the existing plugging materials while drilling are mostly hydrophilic and oleophobic materials, which have poor compatibility with oil-based drilling fluid and are easy to ferment and deteriorate after long time use, affecting the plugging effect; thus, they cannot be used for plugging while drilling of the oil-based drilling fluid.

Few reports are available on special plugging agents for oil-based drilling fluid at present. The Chinese patent document CN105368409A presents a compound plugging agent used for oil-based drilling fluid, which is prepared from raw materials by weight percentage as follows: 20%~50% of plugging materials, 0.5%~2% of fiber materials, 5%~20% of oil-swelling materials, 20%~40% of lipophilic superfine particle materials, and 10%~20% of lipophilic flaky materials. The Chinese patent document CN104232037A presents a crack plugging agent for oil-based drilling fluid, which is composed of the following materials by weight percentage based on the total weight of the drilling fluid system: 10%~15% of oil-swelling materials, 15%~20% of deformable particles, 2%~3% of fiber materials, 5%~10% of plugging materials, 50%~67% of calcium carbonate superfine powders, and 1%~2% of surface-active agents. The plugging agents mentioned in the patents above involve a variety of materials and complicated preparation processes, which has a great influence on the performance of the oil-based drilling fluid. The Chinese patent document CN104448136A presents a plugging agent while drilling for the oil-based drilling fluid, which is prepared as described in the patent by dropwise adding aqueous phases containing propylene water-soluble organic monomers A, water-soluble cross-linking agents B and powdered inorganic materials C into oil D containing dispersing agents E for emulsification to produce the stable suspending plugging agents initiated by the oxidation-reduction system. The plugging agents involved in the above patents are mainly used for plugging while drilling, are suitable for plugging drilling fluids with small leakage and generally have poor plugging performance for fissured formations with large leakage.

At present, all plugging materials have their own disadvantages when used in dealing with the leakage of oil-based drilling fluid: (1) Traditional plugging materials have poor compatibility with the oil-based drilling fluid; (2) Rigid plugging materials have poor size gradation when used in the leakage layer. Particles of small size are easy to lose while particles of large size tend to accumulate in the leakage layer, which leads to the weak pressure bearing capacity after plugging and the difficulty in forming effective plugging in the leakage layer; (3) The conventional resin plugging materials have poor temperature resistance and poor toughness after oil absorption, leading to their inability to form effective pressure-bearing plugging.

Therefore, it is necessary to develop a special plugging agent for oil-based drilling fluid. Formed by chemical and physical cross-linking, this is a kind of high oil-absorption resin particle plugging agent featuring high-temperature resistance, high-elasticity, and strong toughness, which enables it to realize the effective plugging of high-temperature and high-pressure leakage layers.

DESCRIPTION OF THE INVENTION

To address the shortcomings of the existing technologies, especially the inability of the existing resin plugging materials to form effective plugging for leakage layers due to their poor temperature resistance and toughness after oil absorption, the invention presents a high temperature-resistant and high oil-absorption resin particle plugging agent suitable for oil-based drilling fluid and its preparation method. The plugging agent in this invention is prepared by the suspension polymerization reaction of reaction monomers, dispersing agents, cross-linking agents, initiators, modified starches, linear high polymers and filler particles, wherein reaction monomers are cross-linked by polybasic soft and hard chains to form the basic skeleton structure; the adhesive property of modified starches is used to enhance the composite structure of resin materials and reduce their cracking; linear high polymers provide internal crystal nuclei of resin particles and improve the strength and temperature resistance of resin particles; and filler particles play a toughening effect through physical cross-linking to maintain rigid and flexible properties of resin particles. The high temperature-resistant and high oil-absorption resin particle plugging agent in the invention has good performance of temperature resistance and oil absorption and plays a good plugging effect for high-temperature leakage layers.

The technical solution of the invention is as follows:

A high temperature-resistant and high oil-absorption resin particle plugging agent suitable for oil-based drilling fluid, which is prepared from raw materials in parts by mass as follows: 15-30 parts of reaction monomers, 5-12 parts of linear high polymers, 0.1-1.5 parts of cross-linking agents, 0.1-0.5 parts of initiators, 1-3 parts of modified starches, 1-5 parts of filler particles and 1-5 parts of dispersing agents.

According to a preferred embodiment of the invention, the said reaction monomer is a combination of soft branched monomers, hard branched monomers, and polyether monomers by the mass ratio of 1:2:(3-5);

According to a further preferred embodiment, the said soft branched monomer is maleic acid or 2-ethylhexyl acrylate; the said hard branched monomer is vinylidene chloride or vinyl acetate; and the said polyether monomer is ethylene glycol dimethacrylate.

According to a preferred embodiment of the invention, the said linear high polymer is a polyamide with an average particle size of 0.1-0.3 mm and a density of 1.35 g/cm³.

According to a preferred embodiment of the invention, the said cross-linking agent is diphenylmethane diisocyanate or hexamethylene diisocyanate.

According to a preferred embodiment of the invention, the said initiator is tert-butyl peroxide benzoate or lauroyl peroxide.

According to a preferred embodiment of the invention, the said modified starch is a common commercially available pregelatinized starch.

According to a preferred embodiment of the invention, the said filler particle is polyacrylonitrile powder or hydrophobic nano-silica, or a combination of the two, wherein the said polyacrylonitrile powder has an average particle size of 25-35 μm and a density of 1.184 g/cm³, and the hydrophobic nano-silica has an average particle size of 55-65 nm.

According to a preferred embodiment of the invention, the said dispersing agent is polyvinyl alcohol or polyvinylpyrrolidone, wherein the polyvinyl alcohol has a weight-average molecular weight of 67,000 and the polyvinylpyrrolidone has a weight-average molecular weight of 1,300,000.

According to a preferred embodiment of the invention, the said high temperature-resistant and high oil-absorption resin particle plugging agent suitable for oil-based drilling fluid is prepared according to the following steps:

(1) Add dispersing agents into deionized water, heat to 80~95° C. and stir until they are completely dissolved. Cool it to room temperature to get the solution a;

(2) Disperse the modified starch in solution a and stir evenly to get the dispersion solution b;

(3) Add reaction monomers, linear high polymers, filler particles, and cross-linking agents into the dispersion solution b in sequence and stir evenly to get the dispersion solution c;

(4) Heat the dispersion solution c under the nitrogen protection to make the first reaction and get the microemulsion d; dropwise add initiators into the microemulsion d while stirring and heat them to make the second reaction and get the oil-absorption resin particle suspension;

(5) Add detergent into the oil-absorption resin particle suspension obtained in Step (4), stir thoroughly, filter and dry sediments after sedimentation to produce powders and get the high temperature-resistant and high oil-absorption resin particle plugging agents.

According to a preferred embodiment of the invention, the mass ratio of the said dispersing agents and deionized water in Step (1) is 1: (50-100).

According to a preferred embodiment of the invention, the said stirring time in Step (1) is 0.5-1h and the stirring speed is 100-300 r/min.

According to a preferred embodiment of the invention, the said rate of temperature fall in Step (1) is 5"20° C./min and is further preferred to be 10~15° C./min.

According to a preferred embodiment of the invention, the said stirring time in Step (3) is 0.5~2 h and is further preferred to be 1~1.5 h; the stirring speed is 100"400 r/min and is further preferred to be 200~300 r/min.

According to a preferred embodiment of the invention, the said first reaction in Step (4) is carried out in the static state and at the temperature of 60~80° C. which is further preferred to be 65~75° C.; the reaction time is 0.5~3 h and is further preferred to be 1~2 h.

According to a preferred embodiment of the invention, the said second reaction in Step (4) is carried out at the temperature of 70100° C. which is further preferred to be 80~90° C.; the reaction time is 5~7 h.

According to a preferred embodiment of the invention, the said initiators in Step (4) are added dropwise into the system in the form of initiator ethanol dispersion solution in the mass concentration of 0.2~0.4 g/mL; the dropping speed of the said initiator ethanol dispersion solution is 1~5 drops/second and is furthered preferred to be 1~2 drops/second; the initiators shall be added slowly into the microemulsion d; if the addition speed is too fast or too slow, the initiators will not disperse well, resulting in the oil-absorption performance degradation of resin particles.

According to a preferred embodiment of the invention, the said detergent in Step (5) is absolute ethyl alcohol. The volume ratio of the said absolute ethyl alcohol and oil-absorption resin particle suspension is 1: (0.5~2) and is further preferred to be 1: (0.5~1.5).

According to a preferred embodiment of the invention, the said drying in Step (5) is blast drying in a drying oven at the temperature of 40~80° C.

According to an embodiment of the invention, the particle size of the powder made of the said high temperature-resistant and high oil-absorption resin particle plugging agents is 0.1~5 mm and the specific particle size shall be optimized according to the leakage degree of different leakage layers.

The technical features and beneficial effects of the invention are as follows:

1. Compared to traditional oil-absorption particles, the high temperature-resistant and high oil-absorption resin particle plugging agent presented in the invention can present tighter cross-linking in the process of cross-linking polymerization; besides, the addition of filler particles further improves the compactness of the plugging agent and allows it to form a compact three-dimensional network structure, which can improve the temperature resistance to above 150° C.

2. The high temperature-resistant and high oil-absorption resin particle plugging agent presented in the invention consists of two parts: one is the three-dimensional network structure serving as the basic skeleton, which is formed by acrylic copolymers with functional groups obtained by the copolymerization of soft branched monomers with hard branched monomers and the copolymerization of polyether monomers with hard and soft branched monomers; the second is filler particles and linear high polymers, wherein the linear high polymers provide crystal nuclei inside the resin gel particles to improve the strength and temperature resistance of the resin particles, and filler particles are physically cross-linked to the basic skeleton structure to improve the toughness and maintain the rigid and flexible properties of the resin particles. Moreover, the plugging agent in the invention enhances the composite structure of resin materials and reduces their cracking by making use of the adhesive property of modified starches to maintain the rigid and flexible properties of the resin particles.

3. Compared to the traditional oil-absorption particles, the resin particle plugging agent presented in the invention not only has high oil-absorption capacity under high-temperature conditions, but also has high toughness after oil-absorbing expansion and is not easy to break during extrusion and stretching, which enables it to form a highly effective pressure-bearing plugging in leakage layers and keep resin plugging particles from being affected by fracturing factors.

4. The high temperature-resistant and high oil-absorption resin gel particle plugging agent presented in the invention has a simple preparation process and small impact on the performance of oil-based drilling fluid, which brings convenience for production and field operation.

DETAILED EMBODIMENTS

The invention is further described in combination with the embodiments as follows, but is not limited to that.

All raw materials used in the embodiments are conventional raw materials available on the market; unless otherwise specified, the said methods can all be implemented with the existing technologies.

All modified starch in the embodiments was purchased from Hebei Yanxing Chemical Co., Ltd.;

All hydrophobic nano-silicas used were purchased from Shanghai Aladdin Biochemical Technology Co., Ltd. and have an average particle diameter of 60 nm;

All polyvinyl alcohols used were purchased from Shanghai Aladdin Biochemical Technology Co., Ltd. and have a weight-average molecular weight of 67,000;

All polyamides used were purchased from Shanghai Aladdin Biochemical Technology Co., Ltd. and have an average particle size of 0.2 mm and a density of 1.35 g/cm$^3$.

Embodiment 1

A high temperature-resistant and high oil-absorption resin particle plugging agent suitable for oil-based drilling fluid, which is prepared from raw materials in parts by mass as follows: 20 parts of reaction monomers, 10 parts of linear high polymers, 0.75 parts of cross-linking agents, 0.125 parts of initiators, 1 part of modified starch, 2 parts of filler particles and 2 parts of dispersing agents.

The said reaction monomers are the mixture of 2-ethylhexyl acrylates, vinylidene chlorides and ethylene glycol dimethacrylates following the mass ratio of 1:2:3.5; the said linear high polymers are polyamides; the said cross-linking agents are diphenylmethane diisocyanates; the said initiators are tert-butyl peroxide benzoates; the said filler particles are hydrophobic nano-silicas; and the said dispersing agents are polyvinyl alcohols.

The said high temperature-resistant and high oil-absorption resin particle plugging agent suitable for oil-based drilling fluid is prepared in the following steps:

(1) Add dispersing agents into deionized water, heat them to the temperature of 80° C., and stir for 45 min at a speed of 200 r/min until they are completely dissolved; then, cool down to room temperature at a rate of 10° C./min to get the solution a. The said dispersing agents and deionized water have a mass ratio of 1:75;

(2) Disperse modified starches into the solution a and stir evenly to get the dispersion solution b;

(3) Add reaction monomers, linear high polymers, filler particles, and cross-linking agents successively into the dispersion solution b and stir magnetically for 1h at the speed of 250 r/min to get the dispersion solution c;

(4) Heat the dispersion solution c to 70° C. under the nitrogen protection and allow it to react while standing at the temperature of 70° C. for 1.5 h to get the microemulsion d; add initiator ethanol dispersion solution with a mass concentration of 0.3 g/mL into it at the speed of 2 drops/second and then heat to 85° C. and react for 6 h to get the oil-absorption resin particle suspension;

(5) Add the same volume of absolute ethyl alcohol into the oil-absorption resin particle suspension obtained in step (4), stir thoroughly, and filter the solution after sedimentation to get sediments; after that, dry sediments in a drying oven at the temperature of 60° C. to produce powder and get the high temperature-resistant and high oil-absorption resin particle plugging agent A.

The high temperature-resistant and high oil-absorption resin particle plugging agent A with an average particle size of 1 mm is chosen for oil absorbency, toughness, and high temperature plugging tests.

Embodiment 2

A high temperature-resistant and high oil-absorption resin particle plugging agent suitable for oil-based drilling fluid, which is prepared from raw materials in parts by mass as follows: 20 parts of reaction monomers, 8.75 parts of linear high polymers, 1 part of cross-linking agent, 0.125 parts of initiators, 1 part of modified starch, 2.5 parts of filler particles, and 2 parts of dispersing agents.

The said reaction monomers are the mixture of 2-ethylhexyl acrylates, vinylidene chlorides and ethylene glycol dimethacrylates with the mass ratio of 1:2:4; the said linear high polymers are polyamides; the said cross-linking agents are diphenylmethane diisocyanates; the said initiators are tert-butyl peroxide benzoates; the said filler particles are hydrophobic nano-silicas; and the said dispersing agents are polyvinyl alcohols.

The said high temperature-resistant and high oil-absorption resin particle plugging agent suitable for oil-based drilling fluid shall be prepared as described in Embodiment 1, provided however that the temperature in Step (1) shall be heated up to 90° C. to get the high temperature-resistant and high oil-absorption resin particle plugging agent B.

The high temperature-resistant and high oil-absorption resin particle plugging agent B with an average particle size of 1 mm is chosen for oil absorbency, toughness, and high temperature plugging tests.

Embodiment 3

A high temperature-resistant and high oil-absorption resin particle plugging agent suitable for oil-based drilling fluid, which is prepared from raw materials in parts by mass as follows: 17.5 parts of reaction monomers, 10 parts of linear high polymers, 0.75 parts of cross-linking agents, 0.125 parts of initiators, 1.25 parts of modified starches, 2 parts of filler particles and 2.5 parts of dispersing agents.

The said reaction monomers are the mixture of 2-ethylhexyl acrylates, vinylidene chlorides and ethylene glycol dimethacrylates with a mass ratio of 1:2:3; the said linear high polymers are polyamides; the said cross-linking agents are diphenylmethane diisocyanates; the said initiators are tert-butyl peroxide benzoates; the said filler particles are hydrophobic nano-silicas; and the said dispersing agents are polyvinyl alcohols.

The said high temperature-resistant and high oil-absorption resin particle plugging agent suitable for oil-based drilling fluid shall be prepared as described in Embodiment 1, provided however the temperature in Step (1) shall be heated up to 85° C. and the dispersion solution in Step (4) shall react while standing at the temperature of 70° C. for 2 h and then is heated to 85° C. to react for 7h to get the high temperature-resistant and high oil-absorption resin particle plugging agent C.

The high temperature-resistant and high oil-absorption resin particle plugging agent C with an average particle size of 1 mm is chosen for oil absorbency, toughness, and high temperature plugging tests.

Comparative Example 1

A resin particle plugging agent, which is prepared from raw materials in parts by mass as follows: 35 parts of reaction monomers, 10 parts of linear high polymers, 0.75 parts of cross-linking agents, 0.125 parts of initiators, 1 part of modified starch, 2 parts of filler particles and 2 parts of dispersing agents.

The said reaction monomers are the mixture of 2-ethylhexyl acrylates, vinylidene chlorides and ethylene glycol dimethacrylates with a mass ratio of 1:2:3.5; the said linear high polymers are polyamides; the said cross-linking agents are diphenylmethane diisocyanates; the said initiators are tert-butyl peroxide benzoates; the said filler particles are hydrophobic nano-silicas; and the said dispersing agents are polyvinyl alcohols.

The proportion of reactive monomers in the resin particle plugging agent in this comparative example is too high. The preparation method of the resin particle plugging agent is as described in Embodiment 1 to obtain the resin particle plugging agent D.

The resin particle plugging agent D with an average particle size of 1 mm is chosen for oil absorbency, toughness, and high temperature plugging tests.

Comparative Example 2

A resin particle plugging agent, which is prepared from raw materials in parts by mass as follows: 20 parts of reaction monomers, 10 parts of linear high polymers, 0.75 parts of cross-linking agents, 0.125 parts of initiators, 1 part of modified starch, 2 parts of filler particles and 2 parts of dispersing agents.

The said reaction monomers are the mixture of 2-ethylhexyl acrylates and vinylidene chlorides with a mass ratio of 1:2; the said linear high polymers are polyamides; the said cross-linking agents are diphenylmethane diisocyanates; the said initiators are tert-butyl peroxide benzoates; the said filler particles are hydrophobic nano-silicas; and the said dispersing agents are polyvinyl alcohols.

In this comparative example, reaction monomers in the resin particle plugging agent are not added with ethylene glycol dimethacrylates. The preparation method of the said resin particle plugging agent is as described in Embodiment 1 to obtain the resin particle plugging agent E.

The resin particle plugging agent E with an average particle size of 1 mm is chosen for oil absorbency, toughness, and high temperature plugging tests.

Comparative Example 3

A resin particle plugging agent, which is prepared from raw materials in parts by mass as follows: 20 parts of reaction monomers, 10 parts of linear high polymers, 0.75 parts of cross-linking agents, 0.125 parts of initiators, 1 part of modified starch, and 2 parts of dispersing agents.

The said reaction monomers are the mixture of 2-ethylhexyl acrylates, vinylidene chlorides and ethylene glycol dimethacrylates with a mass ratio of 1:2:3.5; the said linear high polymers are polyamides; the said cross-linking agents are diphenylmethane diisocyanates; the said initiators are tert-butyl peroxide benzoates; and the said dispersing agents are polyvinyl alcohols.

In this comparative example, the resin particle plugging agent is not added with hydrophobic nano-silicas as filler particles. The preparation method of the said resin particle plugging agent is as described in Embodiment 1 to obtain the resin particle plugging agent F.

The resin particle plugging agent F with an average particle size of 1 mm is chosen for oil absorbency, toughness, and high temperature plugging tests.

Comparative Example 4

A resin particle plugging agent, which is prepared from raw materials in parts by mass as follows: 20 parts of reaction monomers, 0.75 parts of cross-linking agents, 0.125 parts of initiators, 1 part of modified starch, 2 parts of filler particles and 2 parts of dispersing agents.

The said reaction monomers are the mixture of 2-ethylhexyl acrylates, vinylidene chlorides and ethylene glycol dimethacrylates with a mass ratio of 1:2:3.5; the said cross-linking agents are diphenylmethane diisocyanates; the said initiators are tert-butyl peroxide benzoates; the said filler particles are hydrophobic nano-silicas; and the said dispersing agents are polyvinyl alcohols.

In this comparative example, the resin particle plugging agent is not added with linear high polymers. The preparation method of the said resin particle plugging agent is as described in Embodiment 1 to obtain the resin particle plugging agent G.

The resin particle plugging agent G with an average particle size of 1 mm is chosen for oil absorbency, toughness, and high temperature plugging tests.

Comparative Example 5

A resin particle plugging agent, which is prepared from raw materials in parts by mass as follows: 20 parts of reaction monomers, 10 parts of linear high polymers, 0.75 parts of cross-linking agents, 0.125 parts of initiators, 2 parts of filler particles, and 2 parts of dispersing agents.

The said reaction monomers are the mixture of 2-ethylhexyl acrylates, vinylidene chlorides and ethylene glycol dimethacrylates with a mass ratio of 1:2:3.5; the said linear high polymers are polyamides; the said cross-linking agents are diphenylmethane diisocyanates; the said initiators are tert-butyl peroxide benzoates; the said filler particles are hydrophobic nano-silicas; and the said dispersing agents are polyvinyl alcohols.

In this comparative example, the resin particle plugging agent is not added with modified starches. The preparation method of the said resin particle plugging agent is as described in Embodiment 1 to obtain the resin particle plugging agent H.

The resin particle plugging agent H with an average particle size of 1 mm is chosen for oil absorbency, toughness, and high temperature plugging tests.

Test Example 1

Conduct high-temperature oil absorbency and toughness tests after oil absorption on the resin particle plugging agents prepared in Embodiments 1-3 and Comparative Examples 1-5.

The high-temperature oil absorbency of resin particle plugging agents shall be denoted by the oil absorption rate. The higher the oil absorption rate is, the better the oil absorbency will be.

The oil absorption rate is defined as the mass of the oil-based drilling fluid absorbed by resin particles per unit mass after reaching swelling equilibrium.

$$w = \frac{m_2 - m_1}{m_1} \quad (1)$$

Where: W is the oil absorption rate, in the unit of g/g; $m_1$ is the mass of resin particles before absorbing oil, in the unit of g; $m_2$ is the mass of saturated resin particles after absorbing oil, in the unit of g.

The test method of the oil absorption rate is as follows: weigh a certain amount of resin particles with a precision electronic balance which is denoted as $m_1$, and put them into a high-temperature and high-pressure aging tank filled with oil-based drilling fluid; place the aging tank in an oven at 150° C. and take it out to filter resin particles after 12 hours; use oil-absorbing sheets to remove the oil on the surface of the filtered resin particles and measure the mass of saturated resin particles after absorbing oil, which is denoted as $m_2$; calculate the oil absorption rate of resin particle plugging agents with Formula (1). The results are shown in Table 1.

The toughness of resin particle plugging agents after absorbing oil is denoted by the stretching ratio. The higher the stretching ratio is, the better the toughness will be.

The test method of the stretching ratio is as follows: the stretching ratio is denoted by the ratio of the stretching length of the plugging agent test sample when broken to its original length; before performing the stretching test, prepare resin particle plugging agents into columnar dumbbell-shaped test samples with uniform specifications and an overall length of 8 cm. The middle section of the dumbbell is 4 cm in length and 1 cm in diameter. When measuring the stretching length, maintain the same stretching rate for each stretching test, record the stretching length of the test sample when it is broken and then calculate the ratio to the original length (based on the length of the middle section). The results are shown in Table 1.

dimethacrylates as reaction monomers will have an adverse effect on the oil absorbency and stretching toughness; the high-temperature oil absorption rate of the resin particle plugging agent F is good and reaches 10.14, but the stretching ratio after oil absorption is only 2.15, indicating that the addition of filler particles has little effect on the oil absorbency but will significantly affect the toughness of resin particles; the high-temperature oil absorption rate of the resin particle plugging agent G is 8.45, but the stretching ratio after oil absorption is only 2.63, indicating that the addition of linear high polymers can enhance the oil absorbency of resin particles and will significantly affect the toughness of resin particles; the high-temperature oil absorption rate of the resin particle plugging agent H is as small as 7.10 and the stretching ratio after oil absorption is 1.98 which is the lowest, indicating that the addition of modified starches can not only enhance the oil absorbency of resin particles, but also significantly affect the toughness of resin particles.

The oil absorbency of the plugging agents indicates that the plugging agent is lipophilic, which reflects from one aspect that the plugging agent has good compatibility with oil-based drilling fluid, and the higher oil absorption rate indicates that the particle size of the plugging agents are variable and can be used for plugging fractures with different widths. It can be seen from table 1 that the plugging agent prepared in the invention has good oil absorbency and compatibility with oil-based drilling fluid and also has high oil absorption rate and strong toughness, which enables it to effectively plug fractures with different widths.

Test Example 2

Perform a high-temperature plugging effect test on the resin particle plugging agents prepared in Embodiments 1-3 and Comparative Examples 1-5 in the following steps:

Test the plugging effect of the resin particle plugging agents with a LHKYDL-3 high-temperature and high-pressure leakage-plugging test device and use 20-40 mesh quartz sand as the sand bed for evaluation to simulate the leakage formation. The specific testing method is as follows: add 25 g resin particle plugging agents into 500 mL oil-based drilling fluid and stir them evenly; then, pour the oil-based

TABLE 1

Oil absorption rate and stretching ratio after oil absorption of resin particle plugging agents

| | S/N of plugging agents | | | | | | | |
|---|---|---|---|---|---|---|---|---|
| | A | B | C | D | E | F | G | H |
| Oil absorption rate, g/g | 12.62 | 11.82 | 12.20 | 10.89 | 7.05 | 10.14 | 8.45 | 7.10 |
| Stretching ratio after oil absorption | 5.23 | 4.95 | 5.11 | 4.10 | 2.53 | 2.15 | 2.63 | 1.98 |

According to the data in Table 1, the high temperature-resistant and high oil-absorption resin particle plugging agents A, B and C have the best high-temperature oil absorption rates and stretching ratios after oil absorption; the high-temperature oil absorption rate and stretching ratio after oil absorption of the resin particle plugging agent D come second, indicating that when the total mass of three reaction monomers are out of the scope of this invention, properties of the resin particle plugging agent will reduce; the high-temperature oil absorption rate and stretching ratio after oil absorption of the resin particle plugging agent E are further reduced, indicating that the lack of ethylene glycol drilling fluid containing resin particle plugging agents into the fluid loss drum of the leakage-plugging test device, place a movable piston on the top of it, and then tighten the drum cover to seal it; heat the fluid loss drum to 150° C.; let it stand for 12h until the resin particles are saturated with oil; fill water with a large displacement constant-flux pump to pressurize, and control the pressure increasing rate at a value of 1 MPa for every 10 minutes until the pressure reaches 7 MPa; observe and record the leakage at the outlet of the sand bed. The results are shown in Table 2.

The oil-based drilling fluid used is prepared in the following method: mix the oil phase and water phase by the volume ratio of 8:2, add amide emulsifiers, modified vegetable oil, modified bentonites of long-chained quaternary ammonium salts, CaO and barites, and mix them evenly to get the said oil phase of white oil and the said water phase of 25% $CaCl_2$ saline; the addition amounts of the said amide emulsifiers, modified vegetable oil, modified bentonites of long-chained quaternary ammonium salts, and CaO are 30 g/L, 5 g/L, 10 g/L and 30 g/L, respectively. The said amide emulsifiers, modified vegetable oil, and modified bentonites of long-chained quaternary ammonium salts were purchased from Baroid Drilling Fluids Incorporated. The addition amount of the said barites is 304 g/L to adjust the oil-based drilling fluid to the density of 1.22 g/cm³.

TABLE 2

Simulated leakage-plugging effect on the sand bed with resin particle plugging agents

| Pressure/MPa | | 1 | 2 | 3 | 4 | 5 | 6 |
|---|---|---|---|---|---|---|---|
| Loss degree | A | None | None | None | Dripping loss | Linear loss | Total loss |
| | B | None | None | Dripping loss | Dripping loss | Linear loss | Total loss |
| | C | None | None | Dripping loss | Dripping loss | Linear loss | Total loss |
| | D | None | None | Dripping loss | Linear loss | Total loss | — |
| | E | None | Linear loss | Total loss | — | — | — |
| | F | None | Linear loss | Total loss | — | — | — |
| | G | None | Total loss | — | — | — | — |
| | H | Dripping loss | Total loss | — | — | — | — |

According to the data in Table 2, the high temperature-resistant and high oil-absorption resin particle plugging agents A, B and C have the best leakage-plugging effect on the leakage layer of the sand bed. The dripping loss happens when the plugging agent A bears the pressure of 4 MPa and the plugging agents B and C bear the pressure of 3 MPa; the total loss happens when the plugging agents A, B and C bear the pressure of 6 MPa, which allows them to meet the leakage-plugging requirements in fractures under higher pressure conditions; compared to resin particle plugging agents A, B and C, the pressure bearing capacity of the resin particle plugging agent D comes second and the total loss happens at the pressure of 5 MPa; the pressure bearing capacity of resin particle plugging agents E and F is worse, the linear loss happens at the pressure of 2 MPa and the total loss happens at the pressure of 3 MPa; the pressure bearing capacity of resin particle plugging agents G and H is the worst and the total loss happens at the pressure of 2 MPa. As can be seen from Table 2, the plugging agent in the invention has a good plugging effect at high temperatures.

It can be seen from the data above that the resin gel particle plugging agent presented in the invention not only has high oil absorption capacity under a high temperature condition, but also has high toughness after oil-absorbing expansion; it is not easy to break by extrusion and stretching, and can form an effective pressure-bearing plugging in leakage layers.

What is claimed is:

1. A high temperature-resistant and high oil-absorption resin particle plugging agent suitable for oil-based drilling fluid, characterized in that it comprises raw materials in parts by mass as follows: 15~30 parts of reaction monomers, 5~12 parts of linear high polymers, 0.1~1.5 parts of cross-linking agents, 0.1~0.5 parts of initiators, 1~3 parts of modified starches, 1~5 parts of filler particles and 1~5 parts of dispersing agents.

2. The high temperature-resistant and high oil-absorption resin particle plugging agent suitable for oil-based drilling fluid according to claim 1, characterized in that the reaction monomers is a combination of soft branched monomers, hard branched monomers, and polyether monomers with a mass ratio of 1:2: (3-5).

3. The high temperature-resistant and high oil-absorption resin particle plugging agent suitable for oil-based drilling fluid according to claim 2, characterized in that the soft branched monomers is maleic acid or 2-ethylhexyl acrylate; the hard branched monomers is vinylidene chloride or vinyl acetate; and the polyether monomers is ethylene glycol dimethacrylate.

4. The high temperature-resistant and high oil-absorption resin particle plugging agent suitable for oil-based drilling fluid according to claim 1, characterized in that the linear high polymer is a polyamide with an average particle size of 0.1-0.3 mm and a density of 1.35 g/cm³.

5. The high temperature-resistant and high oil-absorption resin particle plugging agent suitable for oil-based drilling fluid according to claim 1, characterized in that the cross-linking agents is diphenylmethane diisocyanate or hexamethylene diisocyanate; the initiators is tert-butyl peroxide benzoate or lauroyl peroxide.

6. The high temperature-resistant and high oil-absorption resin particle plugging agent suitable for oil-based drilling fluid according to claim 1, characterized in that the filler particle is polyacrylonitrile powder or hydrophobic nano-silica, or a combination of the two, wherein the polyacrylonitrile powder has an average particle size of 25-35 µm and a density of 1.184 g/cm³, and the hydrophobic nano-silica has an average particle size of 55-65 nm.

7. The high temperature-resistant and high oil-absorption resin particle plugging agent suitable for oil-based drilling fluid according to claim 1, characterized in that the dispersing agents is polyvinyl alcohol or polyvinylpyrrolidone.

8. A method for preparing the high temperature-resistant and high oil-absorption resin particle plugging agent of claim 1, which comprises steps as follows:
(1) adding dispersing agents into deionized water, heating to 80~95° C., stirring until they are completely dissolved; and cooling to room temperature to get solution a;
(2) dispersing the modified starches in solution a, and stirring evenly to get dispersion solution b;

(3) adding the reaction monomers, the linear high polymers, the filler particles, and the cross-linking agents into the dispersion solution b in sequence, and stirring evenly to get dispersion solution c;

(4) heating the dispersion solution c under a nitrogen protection to make a first reaction and get microemulsion d; dropwise adding the initiators into the microemulsion d while stirring and heating them to make a second reaction, and get an oil-absorption resin particle suspension; and (5) adding detergent into oil-absorption resin particle suspension, stirring thoroughly, filtering and drying sediments after sedimentation to produce powder, and get the high temperature-resistant and high oil-absorption resin particle plugging agent.

9. The method according to claim 8, characterized in that in Step (1) contains one or more of the following conditions:
   a. the mass ratio of the dispersing agents and the deionized water is 1: (50-100);
   b. stirring time is 0.5-1 hour and stirring speed is 100-300r/min; and
   c. decreasing rate of temperature is 5~20° C./min.

10. The method according to claim 8, characterized in that stirring time in Step (3) is 0.5~2 hours; stirring speed is 100~400r/min.

11. The method according to claim 8, characterized in that in Step (4) contains one or more of the following conditions:
   a. said first reaction is carried out in a static state and at temperature of 60~80° C.; reaction time is 0.5~3 hours;
   b. said second reaction is carried out at temperature of 70~100° C.; reaction time is 5~7 hours; and
   c. said initiators are added dropwise into the microemulsion in a form of initiator ethanol dispersion solution in a mass concentration of 0.2~0.4 g/mL; a dropping speed of the initiator ethanol dispersion solution is 1~5 drops/second.

12. The method according to claim 11, characterized in that its Step (4) contains one or more of the following conditions:
   a. said first reaction is carried out in the static state and at the temperature of 65~75° C.; the reaction time is 1~2 hours;
   b. said second reaction is carried out at the temperature of 80~90° C.; and
   c. the dropping speed of the initiator ethanol dispersion solution is 1~2 drops/second.

13. The method according to claim 8, characterized in that the detergent in Step (5) is absolute ethyl alcohol; the volume ratio of the absolute ethyl alcohol and the oil-absorption resin particle suspension is 1: (0.5-2).

14. The method according to claim 8, characterized in that the volume ratio of absolute ethyl alcohol and the oil-absorption resin particle suspension in Step (5) is 1: (0.5~1.5); the drying is blast drying in a drying oven at temperature of 40~80° C.

* * * * *